United States Patent Office 3,758,476
Patented Sept. 11, 1973

3,758,476
2-(THIENYL-3'-AMINO)-1,3-DIAZACYCLOALKENES
Robert Rippel, Hofheim, Taunus, Heinrich Ruschig, Bad Soden, Taunus, and Ernst Lindner and Manfred Schorr, Frankfurt am Main, Germany, assignors to Farbwerke Hoechst Aktiengesellschaft vormals Meister Lucius & Bruning, Frankfurt am Main, Germany
No Drawing. Filed Aug. 6, 1970, Ser. No. 61,853
Claims priority, application Germany, Aug. 16, 1969, P 19 41 761.9
Int. Cl. C07d 99/06
U.S. Cl. 260—256.5 R           1 Claim

ABSTRACT OF THE DISCLOSURE 2-(thienyl-3'-amino)-diazacycloalkenes of the formula

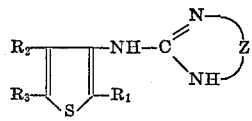

having hypotensive properties, in which $R_1$, $R_2$ and $R_3$ are hydrogen, lower alkyl, halogen, cyano or phenyl or $R_2$ and $R_3$ together are trimethylene or tetramethylene, Z is alkylene of 2–4 carbon atoms of which 2–3 are in the ring, and their acid addition salts. Processes for the preparation of the above compounds.

---

The present invention provides new 2-(thienyl - 3'-amino)-1,3-diazacycloalkenes of the general formula

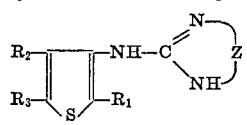

wherein $R_1$, $R_2$ and $R_3$ represent hydrogen, low molecular weight alkyl, halogen, cyano or phenyl;
$R_2$ and $R_3$ represent together a trimethylene or tetramethylene chain;
Z represents a straight or branched alkylene radical having 2–4 C-atoms of which 2–3 C-atoms are members of a ring, and their acid addition salts.

The invention furthermore provides a process for preparing the above-specified compounds, wherein (a) Thienyl - 3 - isothiuronium salts, -thio-ureas, -guanidines, -nitroguanidines or -cyanamides of the Formula II

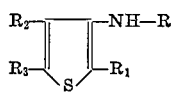

in which R represents the groups

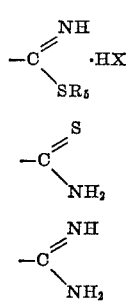

and

—CN            (e)

$R_5$ represents low molecular weight alkyl and X represents an acid anion, preferably that of a halohydric acid, are reacted with alkylene-diamines of the Formula III $$H_2N—Z—NH_2 \qquad \text{(III)}$$

if desired or required in form of their mono-salts, or (b) N-(3'-thienyl) - N' - aminoalkyl-thio-ureas of the Formula IV

in which A represents oxygen or sulfur, are cyclized or (c) Aminothiophens of the Formula V

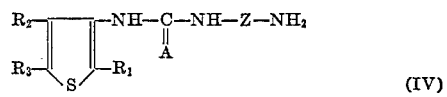

are reacted with 2-alkylmercapto-1,3-diazacycloalkenes of the Formula VI

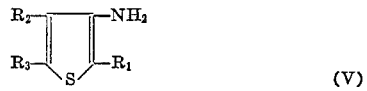

preferably in form of their salts; or (d) Aminothiophens of the Formula V are reacted with bis-(2 - oxo - 1,3 - diaza-cycloalkyl)-phosphrine chlorides of the Formula VII

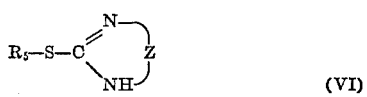

or (e) Thiophen - 3 - isocyanide - dihalides of the Formula VIII

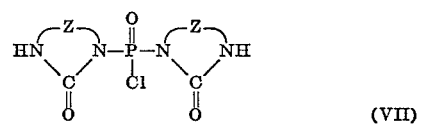

wherein Hal stands for chlorine or bromine, are reacted with alkylene-diamines of the Formula III;

If compounds are obtained in which at least one of the radicals $R_1$, $R_2$, or $R_3$ is hydrogen, they may be halogenated. Also, the products may be converted into the acid addition salts with the aid of physiologically tolerated acids.

(a) The preparation of the new compounds of the Formula I according to method (a) can be effected by simple heating (1⅔ hours) of the isothiouronium salts of the Formula IIa with alkalene-diamines of the Formula III to temperatures in the range between 80–200° C. As alkylenediamines there may be used, for example, ethylenediamine, 1,2 - propylenediamine or 1,3 - propylenediamine, 2,3 - diaminobutane, 1,3 - diaminobutane and 1,2-diaminobutane. The reaction may also be carried out in the presence of a solvent at temperatures in the range from 60–140° C. As solvents, there may be used in particular those solvents which contain polar groups, for example water or lower alcohols, for example methanol, ethanol, n- and iso-propanol. However, if a solvent is used, heating must be extended over a prolonged period of time (5–20 hours), and the operation is to be carried out preferably under pressure. In both cases it is suitable to use an excess (110–150%) of alkylenediamine.

The isothiouronium salts of the Formula III are prepared in known manner by heating of the corresponding thio-ureas of the Formula II with a lower alkylhalide or a dialkylsulfate in a solvent, for example, a lower alcohol. The thio-ureas can also be prepared according to methods known in literature (cf. Houben-Weyl, volume 9, page 887 et seq) from the correspondingly substituted aminothiophens.

It is also possible directly to heat the thio-ureas of the Formula IIb, instead of the isothiouronium salts, together with the alkylenediamines of the general Formula III, preferably under reduced pressure, to temperature in the range between 100 and 200° C. In this respect it is preferable also to use an excess of 1,2 - alkylenediamine.

The products of the invention may also be obtained by reacting alkylenediamines of the general Formula III or their mono-salts with thienyl-3-guanidines of the Formula IIc or with the salts thereof with inorganic or organic acids. In this case too, the reaction may be carried out with or without solvent. The temperatures required are in the range from 100 to 200° C., preferably between 130–150° C. As solvents, higher alcohols or nitrobenzene may be used. Examples of inorganic salts are hydrochlorides, hydrobromides, hydroiodides, sulfates and nitrates; for the organic salts, benzene- or toluene-sulfonates are suitable.

Instead of the thienyl-3-guanidines, also the corresponding nitro-guanidines of the Formula IId may be used as starting substances and may be heated with alkylenediamines of the general Formula III in suitable solvents, for example ethanol, propanol, butanol or amyl-alcohol. The starting products may be obtained by reaction of a corresponding aminothiophen with N-methyl-N-nitroso-N'-nitroguanidine according to the method described in the Journal of the American Chemical Society, Volume 69, page 3028 (1947).

The reaction of thienyl-3-cyanamides of the Formula IIe with alkylenediamines or of the mono-salts thereof is carried out preferably at temperatures in the range from 50–200° C., especially in the range from 100 to 150° C., in the presence or absence of a solvent. It is advantageous to operate with an excess of alkylenediamine or of the salts thereof and to select such a solvent that the reaction can take place in a homogenous phase. As solvents, higher alcohols such as butanol, amylalcohol or hexanol, may be used; suitable salts of alkylenediamines are for example, the monohydroiodides or mono-p-toluene-sulfonates. The thienyl-3-cyanamides can be prepared from the corresponding thienyl-3-thio ureas and copper sulfate in an alkaline solution.

(b) The N-(3'-thienyl)-N'-(aminoalkyl)-thio-ureas or -ureas of the Formula IV, serving as starting products for the method (b), are prepared in a manner analogous to the method described in the Journal of Organic Chemistry, Volume 24, page 818 (1959), by reaction of correspondingly substituted thienyl-3-isocyanates or -isothiocyanates with alkylenediamines of the Formula III. Cyclization is then effected by heating to temperatures in the range from 150 to 200° C. in the presence or in the absence of a solvent; preferably, the operation is carried out using a protective atmosphere, for example, nitrogen.

(c) The reaction of 3-amino-thiophenes of the Formula V with alkylmercapto-1,3-diazacycloalkenes of the Formula VI may also be carried out in the presence or absence of a solvent. However, a sufficiently high temperature must be used in order to remove the alkylmercaptane from the reaction mixture. In general, the reaction is carried out at temperatures in the range from 70–200° C. As solvents, there may be used high boiling ethers, alcohols, for example methanol, ethanol, propanol, saturated cyclic hydrocarbons such as cyclohexane and methylcyclohexane, aromatic hydrocarbons such as benzene, toluene, xylene, and chlorinated hydrocarbons such as chloro- and dichlorobenzene.

The required alkylmercapto-1,3-diazacycloalkenes of the general Formula VI, which are used in the form of their salts, for example as hydroiodides, can be prepared in known manner by alkylation of the corresponding alkylene-thio-ureas according to Organic Syntheses III, page 394.

(d) Another method to obtain compounds of the general Formula I consists in heating bis-(2-oxo-1,3-diazacycloalkenyl)-phosphine chlorides of the Formula VII with aminothiophens of the Formula V in an inert organic solvent, for example xylene or mesitylene, to temperatures in the range from about 100–180° C. The starting substances of the Formula VII may be obtained in known manner by the reaction of correspondingly substituted 1,3-diazacycloalkanone-(2) with phosphorus pentachloride in chloroform at temperatures between 20 and 40° C. (cf. Bull. Soc. Chim. France, 1961, page 2114).

(e) Thieophen-3-isocyanide-dihalides of the Formula VIII are also suitable for the preparation of the products of the invention. The reaction with the alkylene-diamines of the Formula III is effected best in an organic solvent at temperatures between 0° C. and the boiling point of the solvent used. As solvents, there may be used dioxane, alcohols such as methanol, ethanol, propanol or butanol, ketones, aromatic hydrocarbons, for example benzene, toluene, xylene and halogenated aliphatic or aromatic hydrocarbons. In this reaction, 2 mols of hydrohalic acid are formed, per mol of isocyanide-dihalide, which are bound either by an excess of alkylene-diamine, by potassium or sodium carbonate or by tertiary amines such as trimethylamine, triethylamine, tributylamine, N,N-dimethylcyclohexyl-amine.

If desired, compounds of the Formula I, in which at least one of the substituents $R_1$, $R_2$ or $R_3$ represents hydrogen, may be halogenated. Thereby compounds are obtained in which $R_1$ and/or $R_2$ and/or $R_3$ stand for one or several halogen atoms. As halogenating agents, elemental bromine, chlorine, sulfurylchloride, N-chloro-succinimide, bromo-succinimide, 1,3-dichloro-5,5-dimethylhydantoine and iodine monochloride may be used. Depending on the halogenating agents, the operation is then carried out in ether, methylene chloride, chloroform, carbon tetrachloride, carbon disulfide, glacial acetic acid, nitrobenzene, thionyl chloride or sulfuryl chloride, at temperatures between 0° C. and the boiling point of the respective solvent, if necessary with addition of catalysts, for example aluminum-chloride or iron-III chloride.

The compounds of the general Formula I may be converted into the corresponding acid addition salts by the usual methods. For the salt formation, inorganic and organic acids may be used, for example acetic acid, lactic acid, propionic acid, malic acid, fumaric acid, tartaric acid, citric acid, aceturic acid, ascorbic acid, hydroxymethane-sulfonic acid, hydrochloric acid or hydrobromic acid.

The compounds obtained according to the present invention are in their free-form or in the form of their salts valuable therapeutic agents having interesting pharmacological, especially blood pressure lowering, properties. They can be processed into dosage unit forms suitable for any pharmaceutical purposes.

The following examples illustrate the invention:

EXAMPLE 1

(a) 2-(thienyl-3'-amino)-1,3-diazacyclopentene-(2)

30.0 g. of 3'-thienyl-S-methyl-isothiouronium hydroiodide (melting point 113–115° C.), obtained from N-3- thienyl-thio-urea (melting point 185–187° C.) and methyl-iodide in absolute methanol, were shaken for 20 hours at 100° C. with 10.8 ml. of ethylene-diamine and 125 ml. of methanol in an autoclave. After cooling, the methanol was removed by distillation under reduced pressure, the residue was dissolved in dilute hydrochloric acid, undissolved matter was removed by filtration and the aqueous, hydrochloric phase was extracted several times by shaking with methylene chloride. The aqueous phase was then filtered with charcoal and rendered alkaline by the addition of concentrated sodium hydroxide solution. The base that precipitated was filtered-off with suction, dried and recrystallized from benzene (melting point 155–156° C.). From the free base, there was obtained, with ethereal hydrochloric acid, the hydrochloride of 2(3'-thienyl-amino)-1,3-diazacyclopentene-(2), which was recrystallized from a mixture of isopropanol and petroleum ether (melting point 187–188° C.)

In analogous manner there were obtained:

(b) 2-(4'-methylthienyl-3'-amino)-1,3-diazacylopentene-(2) (melting point 156–158° C.); hydrochloride (melting point 200–202° C.),
(c) 2-(4'-methylthienyl-3'-amino)-1,3-diaza-4-methyl-cyclopentene-(2) (melting point 172–173° C.); hydrochloride (melting point 132–133° C.),
(d) 2-(4'-chlorothienyl-3'-amino)-1,3-diazacyclopentene-(2) (melting point 174–175° C.); hydrochloride (melting point 205° C.),
(e) 2-(2',4'-dimethylthienyl-3'-amino)-1,3-diazacyclopentene-(2),
(f) 2-(2',4'-dichlorothienyl-3'-amino)-1,3-diazacyclopentene-(2),
(g) 2-(2'-chloro-4'-methyl-thienyl-3'-amino)-1,3-diazacyclopentene-(2) (melting point 152° C.); hydrochloride (melting point 228–229° C.),
(h) 2-(5'-methylthienyl-3'-amino)-1,3-diazacyclopentene-(2),
(i) 2-(4',5'-dimethylthienyl-3'-amino)-1,3-diazacyclopentene-(2),
(k) 2-(4'-ethyl-5'-methylthienyl-3'-amino)-1,3-diazacyclopentene-(2),
(l) 2-(5'-phenylthienyl-3'-amino)-1,3-diazacyclopentene-(2),
(m) 2-(4',5'-tetramethylenethienyl-3'-amino)-1,3-diazacyclopentene-(2),
(n) 2-(4'-phenyl-5'-methylthienyl-3'-amino)-1,3-diazacyclopentene-(2),
(o) 2-(2'chloro-4'-methylthienyl-3'-amino)-1,3-diaza-4-methyl-cyclopentene-(2); hydrochloride melting point 168–169° C.,
(p) 2-(2',5'-dichloro-4'-methylthienyl-3'-amino)-1,3-diazacyclopentene-(2); hydrochloride melting point 167–168° C.,
(q) 2-(2'-chlorothienyl-3'-amino)-1,3-diazacyclopentene-(2); hydrochloride melting point 181–182° C.,
(r) 2-(2'-iodo-4'-methylthienyl-3'-amino)-1,3-diazacyclopentene-(2); hydrochloride melting point 215–216° C.,
(s) 2-(2',5'-diiodo-4'-methylthienyl-3'-amino)-1,3-diazacyclopentene-(2); hydrochloride melting point 204–205° C.

EXAMPLE 2

2-(4'-methylthienyl-3'-amino)-1,3-diaza-4-methyl-cyclopentene-(2)

31.3 g. of 4'-methylthienyl-3'-S-methyl-isothiouronium hydroiodide (melting point 119–120° C.), obtained from 4-methylthienyl-3-thio-urea (melting point 158–159° C.) and methyl iodide in absolute methanol were heated together with 8.2 g. of 1,2-diaminopropane for 1 hour to 130–150° C. A strong evaluation of methyl mercaptan could be observed. After cooling, the residue was treated with dilute hydrochloric acid, insoluble matter was filtered off, the acid solution was extracted several times with methylene chloride and filtered with charcoal. It was then rendered alkaline with concentrated sodium hydroxide solution, while cooling with ice. The base that precipitated was filtered off with suction, washed with a small amount of ice-water, dried and recrystallized from isopropanol (melting point 173–174° C.). The hydrochloride, which was obtained with ethereal hydrochloric acid from the base, was found to melt at 132–133° C. (from isopropanol/petroleum ether).

The compounds listed in Example 1 could also be prepared in a manner analogous to that described in Example 2.

EXAMPLE 3

(a) 2-(2',5'-dibromo-4'-methylthienyl-3'-amino)-1,3-diazacyclopentene-(2)

1.8 g. of 2-(4'-methylthienyl-3'-amino)-1,3-diazacyclopentene-(2) were dissolved in 15 ml. of glacial acetic acid and to this solution a solution of 1.02 ml. of bromine in 15 ml. of glacial acetic acid was added dropwise at room temperature and while stirring. The whole was stirred for 20 minutes, the suspension was introduced into 50 ml. of ice-water and the solution so obtained was rendered alkaline while cooling with ice. The base that precipitated was filtered off with suction, washed with ice-water, dried and converted into the hydrochloride by means of ethereal hydrochloric acid. After recrystallization from a mixture of isopropanol and ether, the 2-(2',5' - dibromo - 4' - methylthienyl - 3'-amino)-1,3-diazacyclopentene-(2) was found to melt at 224–225° C. The following compounds could be prepared in a manner analogous to that described in Example 3:

(b) 2-(2',5'-dibromo-thienyl-3'-amino)-1,3-diazacyclopentene-(2),
(c) 2-(2',5'-dibromo-4'-chlorothienyl-3'-amino)-1,3-diazacyclopentene-(2),
(d) 2-(2'-bromo-4',5'-dimethyl thienyl-3'-amino)-1,3-diazacyclopentene-(2),
(e) 2-(2'-bromo-4'-ethyl-5'-methylthienyl-3'-amino)-1,3-diazacyclopentene-(2),
(f) 2-(2',5'-dibromothienyl-3'-amino)-1,3-diazacyclohexene-(2).

EXAMPLE 4

(a) 2-(2'-chloro-4'-methyl-thienyl-3'-amino)-1,3-diazacyclopentene-(2)

10 g. of 2-(4'-methyl-thienyl-3'-amino)-1,3-diazacyclopentene(2) were dissolved in 125 ml. of chloroform and to this solution a solution of 7.5 ml. of sulfuryl chloride in 15 ml. of chloroform was added dropwise at 0° C. The whole was then heated for 2 hours to the boiling temperature. After cooling, chloroform and excess sulfuryl chloride were removed by distillation under reduced pressure. The residue was dissolved in dilute hydrochloric acid, the hydrochloric phase was extracted several times by shaking with methylene chloride and then filtered over charcoal. The acid solution was rendered alkaline with 6 N-sodium hydroxide solution, while cooling with ice, and the base was immediately extracted with methylene chloride. The methylene chloride layer was dried, the solvent was removed by distillation under reduced pressure, the residue was dissolved in a large amount of ether and the hydrochloride was precipitated by means of ethereal hydrochloric acid and recrystallized from a mixture of isopropanol and petroleum ether; it was found to melt at 228–229° C. The melting point of the free base was 152° C. (from methyl-cyclohexane benzene).

In analogous manner there were obtained:

(b) 2-(2',4'-dichlorothienyl-3'-amino)-1,3-diazacyclopentene-(2); decomposition point of the hydrochloride from 295° C. onwards,
(c) 2-(2'-chloro-5'-methylthienyl-3'-amino)-1,3-diazacyclopentene-(2)
(d) 2-(2'-chloro-4,5-dimethylthienyl-3'-amino)-1,3-diazacyclopentene-(2), (e) 2-(2'-chloro-4'-ethyl-5'-methylthienyl-3'-amino)-1,3-diazacyclopentene-(2),
(f) 2-(2'-chloro-4'-methylthienyl-3'-amino)-1,3-diazacyclohexene-(2),
(g) 2-(2'-chloro-4'-5'-tetramethylenethienyl-3'-amino)-1,3-diazacyclopentene-(2),
(h) 2-(2'-chloro-4'-methylthienyl-3'-amino)-1,3-diaza-4-methylcyclopentene-(2); hydrochloride melting point 168–169° C.,
(i) 2-(2'-chlorothienyl-3'-amino)-1,3-diazacyclopentene-(2); hydrochloride melting point 181–182° C.,
(k) 2-(2'-chloro-4'-ethylthienyl-3'-amino)-1,3-diazacyclopentene-(2).

EXAMPLE 5

(a) 2-(4'-methylthienyl-3'-amino)-1,3-diazacyclohexene-(2)

7.9 g. of 4'-methylthienyl-3'-S-methylisothiouronium hydroiodide (melting point 119–120° C.; preparation cf. Example 2) were shaken for 20 hours at 100° C. in an autoclave together with 2.1 g. of 1,3-diaminopropane and 25 ml. of methanol. Working-up was effected in a manner analogous to that described in Example 1. The free base was found to melt, after recrystallization from isopropanol, at 166–167° C.; the melting point of the hydrochloride was at 154–155° C.

In analogous manner there were obtained:

(b) 2-(4'-methylthienyl-3'-amino)-1,3-diazacyclohexene-(2),
(c) 2-(thienyl-3'-amino)-1,3-diazacyclohexene-(2),
(d) 2-(4'-chlorothienyl-3'-amino)-1,3-diazacyclohexene-(2),
(e) 2-(2',4'-dimethylthienyl-3'-amino)-1,3-diazacyclohexene-(2),
(f) 2-(2',4'-dichlorothienyl-3'-amino)-1,3-diazacyclohexene-(2),
(g) 2-(5'-methylthienyl-3'-amino)-1,3-diazacyclohexene-(2),
(h) 2-(4',5'-dimethylthienyl-3'-amino)-1,3-diazacyclohexene-(2),
(i) 2-(4'-ethyl-5'-methylthienyl-3'-amino)-1,3-diazacyclohexene-(2),
(k) 2-(5'-phenylthienyl-3'-amino)-1,3-diazacyclohexene-(2),
(l) 2-(4',5'-tetramethylenethienyl-3'-amino)-1,3-diazacyclohexene-(2),
(m) 2-(4'-phenyl-5'-methylthienyl-3'-amino)-1,3-diazacyclohexene-(2).

EXAMPLE 6

(a) 2-(2'-iodo-4'-methylthienyl-3'-amino)-1,3-diazacyclopentene-(2)

1.8 g. of 2-(4'-methylthienyl-3'-amino)-1,3-diazacyclopentene-(2) were dissolved in 30 ml. of glacial acetic acid and, at room temperature, a solution of 1.63 g. of iodomono-chloride in 17 ml. of glacial acetic acid was added dropwise. Then, 75 ml. of water were added, the whole was heated within 20 minutes to 80° C. and left at this temperature until the color of iodine disappeared. After cooling, charcoal was added, the whole was filtered and rendered alkaline, while cooling, with sodium hydroxide solution. The solid residue was dissolved in ether, acidified with ethereal hydrochloric acid, the solvent was removed, the residue was boiled up with acetone and then filtered off with suction. The hydrochloride of the 2-(2'-iodo-4'-methylthienyl-3'-amino) - 1,3 - diazacyclopentene-(2) was found to melt, after recrystallization from a mixture of ethanol and diisopropyl ether, at 215 to 216° C.
In analogous manner there were obtained:

(b) 2-(2'-iodothienyl-3'-amino)-1,3-diazacyclopentene-(2),
(c) 2-(2'-iodo-4'-methylthienyl-3'-amino)-1,3-diaza-4-methylcyclopentene-(2),
(d) 2-(2'-iodo-4'-chlorothienyl-3'-amino)-1,3-diazacyclopentene-(2),
(e) 2-(2'-iodo-4'-methylthienyl-3'-amino)-1,3-diazacyclohexene-(2),
(f) 2-(2'-iodo-5'-methylthienyl-3'-amino)-1,3-diazacyclopentene-(2),
(g) 2-(2'-iodo-4',5'-dimethylthienyl-3'-amino)-1,3-diazacyclopentene-(2),
(h) 2-(2'-iodo-4',5'-tetramethylenethienyl-3'-amino)-1,3-diazacyclopentene-(2),
(i) 2-(2'-iodo-4',5'-tetramethylenethienyl-3-(amino)-1,3-diazacyclohexene-(2),
(k) If in Example 6a, 3.25 g. of iodomonochloride used, 2-(2',5'-diiodo-4'-methylthienyl - 3' - amino)-1,3-diazacyclopentene-(2) obtained. (Melting point of the hydrochloride 204–205° C.).

In analogous manner there are obtained:

(l) 2-(2',5'-diiodothienyl-3'-amino)-1,3-diazacyclopentene-(2),
(m) 2-(2',5'-diiodo-4'-methylthienyl-3'-amino)-1,3-diaza-4-methylcyclopentene-(2),
(n) 2-(2',5'-diiodo-4'-methylthienyl-3'-amino)-1,3-diazacyclohexene-(2),
(o) 2-(2',5'-diiodo-4'-chlorothienyl-3'-amino)-1,3-diazacyclopentene-(2),
(p) 2-(2',5'-diiodo-4'-chlorothienyl-3'-amino)-1,3-diazacyclohexene-(2),
(q) 2-(2',5'-diiodo-4'-chlorothienyl-3'-amino)-1,3-diaza-4-methylcyclopentene-(2).

EXAMPLE 7

(a) 2-(2',5'-dichloro-4'-methylthienyl-3'-amino)-1,3-diazacyclopentene-(2)

5 g. of hydrochloride of the 2-(4'-methylthienyl-3'-amino)-1,3-diazacyclopentene-(2) were suspended in 10 ml. of benzene and then 5 ml. of sulfuryl chloride were added dropwise. The whole was heated for 2 hours to the boiling temperature, the benzene was distilled off, the residue was boiled up with acetone and filtered off with suction. After recrystallization from a mixture of ethanol and diisopropyl ether, the hydrochloride of the 2-(2',5'-dichloro-4-methylthienyl - 3' - amino)-1,3-diazacyclopentene-(2) was found to melt at 167–168° C.

In analogous manner there were obtained:

(b) 2-(2',5'-dichlorothienyl-3'-amino)-1,3-diazacyclopentene-(2),
(c) 2-(2',4',5'-trichlorothienyl-3'-amino)-1,3-diazacyclopentene-(2),
(d) 2-(2',5'-dichlorothienyl-3'-amino)-1,3-diaza-4-methylcyclopentene-(2),
(e) 2-(2',5'-dichloro-4'-methylthienyl-3'-amino)-1,3-diazacyclohexene-(2),
(f) 2-(2',5'-dichloro-4'-methylthienyl-3'-amino)-1,3-diaza-4-methylcyclopentene-(2),
(g) 2-(2',5'-dichlorothienyl-3'-amino)-1,3-diazacyclohexene-(2),
(h) 2-(2',4',5'-trichlorothienyl-3'-amino)-1,3-diaza-4-methylcyclopentene-(2),
(i) 2-(2',4',5'-trichlorothienyl-3'-amino)-1,3-diazacyclohexene-(2).

EXAMPLE 8

2-(4'-methylthienyl-3'-amino)-1,3-diazacyclopentene-(2)

2.4 g. of 4-methylthienyl-3-guanidine (hydrochloride melting point 201–202° C.) and 4 g. of ethylene diamine-mono-p-toluene-sulfonate were heated in 25 ml. of ethanol for 48 hours to boiling temperature. The solvent was removed by distillation under reduced pressure, the residue was combined with dilute sodium hydroxide solution and extracted several times with methylene chloride. After drying over sodium sulfate, the solvent was removed and the solid residue was filtered off with suction after trituration with ether. With ethereal hydrochloric acid, there was obtained from the free base the hydrochloride 2-(4' - methylthienyl-3'-amino)-1,3-diazacyclopentene-(2), which was found to melt at 200-202° C.

The compounds listed in Example 1 can also be prepared in analogous manner.

EXAMPLE 9

2-(4'-methylthienyl-3'-amino)-1,3-diazacyclopentene-(2)

2.2 g. of N-(4-methylthienyl-3) - N' - (amino-ethyl)-thio-urea (melting point 128-129° C.) were dissolved in 25 ml. of ethanol, 4 g. of lead-II-oxide were added and the whole was shaken for 4 hours in an autoclave at 100° C. The lead sulfide that formed was filtered off with suction and the ethanol was removed by distillation. The residue was dissolved in dilute hydrochloric acid, filtered with charcoal and the acid solution was rendered alkaline, while cooling, with sodium hydroxide solution. The free base was filtered off with suction and dried. Melting point after recrystallization from isopropanol 156-158° C. Hydrochloride melting point 200-202° C.

The compounds listed in Example 1 can also be prepared in analogous manner.

EXAMPLE 10

2-(4'-methylthienyl-3'-amino)-1,3-diazacyclopentene-(2)

2.6 g. of 4-methylthienyl-3-nitroguanidine (melting point 188-189° C.) and 0.85 g. of ethylene diamine were heated to the boiling temperature for 24 hours in 50 ml. of ethanol. After removal of the solvent by distilaltion under reduced pressure, the oily residue was brought to crystallize by a small amount of water and filtered off with suction. For preparing the hydrochloride, the base was dissolved in methylene chloride, filtered with charcoal and combined with ethereal hydrochloric acid. The oily residue remaining behind after evaporation of the solvent crystallized upon treatment with acetone. Melting point 200-202° C., from isopropanol.

The compounds listed under Example 1 can also be prepared in a manner analogous to that described in Example 10.

EXAMPLE 11

2-(4-methylthienyl-3'-amino)-1,3-diazacyclopentene-(2)

3.1 g. of mono-p-toluene-sulfonate of the ethylene diamine were dissolved in 20 ml. of amyl-alcohol. A solution of 1 g. of 4-methylthienyl-3-cyanamide (melting point 97-98° C.) in 20 ml. of amyl alcohol was added dropwise to the boiling solution and the whole was heated for a further 5 hours to the boiling temperature. After cooling, insoluble matter was filtered off, the residue was washed with ether and the filtrate was evaporated under reduced pressure. The residue was dissolved in dilute hydrochloric acid, filtered with charcoal and therefrom, the free base was precipitated by means of sodium hydroxide solution, while cooling, and was then recrystallized from isopropanol. It was found to melt at 156-158° C. Melting point of the hydrochloride 200-202° C.

We claim:
1. A 2-(thienyl-3'-amino)-1,3-diazacycloalkene of the formula

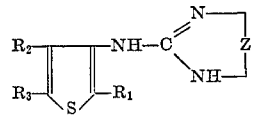

and the acid addition salts thereof with physiologically tolerated acids, wherein $R_1$, $R_2$, and $R_3$ taken alone are hydrogen, methyl, ethyl, halogen, cyano, or phenyl; $R_2$ and $R_3$ taken together are trimethylene or tetramethylene; and Z is straight-chain or branched alkylene having 2-4 carbon atoms, of which 2-3 carbon atoms are ring members.

References Cited
UNITED STATES PATENTS 3,242,194  3/1966  Walton et al. ____ 260—329 A M
3,483,203  12/1969  Werner _____ 260—309.6

RICHARD J. GALLAGHER, Primary Examiner

U.S. Cl. X.R.

260—251 R, 256.4 E, 307.6, 309.7, 329 AM, 329 S, 332.2 A, 332.5, 999